US012811397B2

(12) United States Patent
Vallender et al.

(10) Patent No.: US 12,811,397 B2
(45) Date of Patent: Nov. 24, 2026

(54) SYSTEM AND METHOD FOR OPERATING A LOW VOLTAGE POWER SYSTEM

(71) Applicant: GM GLOBAL TECHNOLOGY OPERATIONS LLC, Detroit, MI (US)

(72) Inventors: Joshua A. Vallender, Farmington, MI (US); Robert A. De Stefano, Macomb Township, MI (US); Jonathan O. Conell, Sterling Heights, MI (US); Turjo M.A. Imam, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/063,823

(22) Filed: Feb. 26, 2025

(65) Prior Publication Data

US 2026/0254242 A1 Aug. 27, 2026

(51) Int. Cl.

| | |
|---|---|
| ***H02J 3/007*** | (2026.01) |
| ***B60L 58/18*** | (2019.01) |
| ***H02J 7/34*** | (2006.01) |
| ***H02J 7/82*** | (2026.01) |
| *H02J 105/37* | (2026.01) |

(52) U.S. Cl.

CPC .............. *H02J 3/007* (2020.01); *B60L 58/18* (2019.02); *H02J 7/342* (2020.01); *H02J 7/82* (2026.01); *H02J 2105/37* (2026.01)

(58) Field of Classification Search

CPC .... H02J 3/007; H02J 7/34; H02J 7/342; H02J 7/82; B60L 58/18

USPC ........................................................ 307/10.1

See application file for complete search history.

(56) References Cited

U.S. PATENT DOCUMENTS

| | | | | |
|---|---|---|---|---|
| 2004/0174141 A1* | 9/2004 | Luz | G01R 31/36 | 320/132 |
| 2012/0032506 A1* | 2/2012 | Cawthorne | F02N 11/0866 | 307/10.6 |
| 2015/0349471 A1* | 12/2015 | Maki | B60R 16/0215 | 307/10.1 |
| 2019/0305581 A1* | 10/2019 | Kinoshita | H02J 7/1423 | |
| 2020/0369176 A1* | 11/2020 | Moriya | B60L 3/0046 | |
| 2022/0097549 A1* | 3/2022 | Oishi | B60L 53/14 | |

FOREIGN PATENT DOCUMENTS

| | | |
|---|---|---|
| DE | 102012215385 A1 | 3/2013 |
| DE | 102018113156 A1 | 12/2018 |

* cited by examiner

*Primary Examiner* — Daniel Kessie
*Assistant Examiner* — Dru M Parries
(74) *Attorney, Agent, or Firm* — Dority & Manning, P.A.

(57) ABSTRACT

A low voltage power system includes a first and second power source electrically connected with a main power distribution module. The main power distribution module includes a first portion having a first set of fuses and a second portion having a second set of fuses with the first portion selectively connectable to the second portion with a switch. The system also includes a first and second power grid electrically connected with the first and second portions of the main power distribution module, and a starter relay electrically connected with the first power source through the first power grid. The system further includes a controller in electrical communication with the starter relay and the switch configured to selectively actuate the switch from a closed position to an open position based on an engine start request and a status of the second power source.

20 Claims, 3 Drawing Sheets

SYSTEM AND METHOD FOR OPERATING A LOW VOLTAGE POWER SYSTEM

BACKGROUND

The present disclosure relates to a low voltage power system, and more particularly, to a system and method managing power in the low voltage power system.

Hybrid or plug-in hybrid electric vehicles (PHEV) utilize a high voltage power system having a high voltage battery pack configured to drive a traction motor and an internal combustion engine (ICE) to provide propulsion for the vehicle. PHEVs generally have larger battery packs compared to hybrid vehicles. This allows PHEV to travel further distances on the electric motor without operating the ICE. However, the ICE may be engaged during certain driving scenarios or once the high voltage battery pack has been depleted to a predetermined level. To start the ICE, the vehicle may utilize a starter electrically connected with a low voltage power system. The low voltage power system is separate from the high voltage power system used to drive the traction motor.

SUMMARY

Disclosed herein is a low voltage power system. The system includes a first power source electrically connected with a main power distribution module and a second power source electrically connected with the main power distribution module. The main power distribution module includes a first portion having a first set of fuses and a second portion having a second set of fuses with the first portion selectively connectable to the second portion with a switch. The system also includes a first power grid electrically connected with the first portion of the main power distribution module, a second power grid electrically connected with the second portion of the main power distribution module, and a starter relay electrically connected with the first power source through the first power grid. The system further includes a controller in electrical communication with the starter relay and the switch configured to selectively actuate the switch from a closed position to an open position based on an engine start request and a status of the second power source.

In one aspect of the disclosure the controller is configured to close the starter relay and open the switch in response to the engine start request and the status of the second power source being operational.

In one aspect of the disclosure the controller is configured to close the starter relay and maintain the switch in a closed position in response to the engine start request and the second power source being non-operational.

In one aspect of the disclosure the controller is configured to selectively open the switch upon receiving an engine start request and a functional operating status of the second power source.

In one aspect of the disclosure the first portion of the main power distribution module is isolated from the second portion of the main power distribution module when the switch is open.

In one aspect of the disclosure the main power distribution module includes a plurality of main output fuses each having a greater amperage rating that the first plurality of fuses and the second plurality of fuses.

In one aspect of the disclosure the first power grid is electrically connected with a first plurality of electrical components and the first plurality of electrical components are non-voltage critical components.

In one aspect of the disclosure the second power grid is electrically connected with a second plurality of electrical components and the second plurality of electrical components include voltage critical components.

In one aspect of the disclosure the system includes a set of dual input electrical components each electrically connected with the first power grid and the second power grid.

In one aspect of the disclosure the switch includes at least one bi-direction field-effect transistor.

In one aspect of the disclosure the switch includes a pair of bi-direction field-effect transistors.

In one aspect of the disclosure the first power source and the second power source operate at under 20V.

In one aspect of the disclosure the first power source includes a low voltage battery and the second power source includes an auxiliary power module.

Disclosed herein is a method of operating a low voltage power system. The method includes receiving an engine start request to start an internal combustion engine with a low voltage power system. The system includes a first power source electrically connected with a main power distribution module and a second power source electrically connected with the main power distribution module. The main power distribution module includes a first portion having a first set of fuses and a second portion having a second set of fuses with the first portion selectively connectable to the second portion with a switch. The system also includes a first power grid electrically connected with the first portion of the main power distribution module, a second power grid electrically connected with the second portion of the main power distribution module, and a starter relay electrically connected with the first power source through the first power grid. The method also includes selectively actuating the switch based on the engine start request and a status of the second power source.

In one aspect of the disclosure the method includes closing the starter relay and opening the switch in response to the engine start request and the status of the second power source being operational.

In one aspect of the disclosure the method includes closing the starter relay and maintaining the switch in a closed position in response to the engine start request and the second power source being non-operational.

In one aspect of the disclosure the method includes selectively opening the switch upon receiving the engine start request and a functional operating status of the second power source.

Disclosed herein is a vehicle. The vehicle includes a body at least partially defining a passenger cabin, wheels supporting the body, an internal combustion engine configured to drive the plurality of wheels, and a starter in engagement with the internal combustion engine configured to start the internal combustion engine. The vehicle also includes a traction motor electrically connected with a traction battery configured to drive the wheels in connection with the internal combustion engine. The vehicle also includes a low voltage power system, a first power source electrically connected with a main power distribution module and a second power source electrically connected with the main power distribution module. The main power distribution module includes a first portion having a first set of fuses and a second portion having a second set of fuses with the first portion selectively connectable to the second portion with a switch. The system also includes a first power grid electrically connected with the first portion of the main power distribution module, a second power grid electrically connected with the second portion of the main power distribution module, and a starter relay electrically connected with the first power source through the first power grid. The system further includes a controller in electrical communication with the starter relay and the switch configured to selectively actuate the switch from a closed position to an open position based on an engine start request and a status of the second power source.

In one aspect of the disclosure the controller is configured to close the starter relay and open the switch in response to the engine start request and the status of the second power source being operational.

In one aspect of the disclosure the controller is configured to close the starter relay and maintain the switch in a closed position in response to the engine start request and the second power source being non-operational.

BRIEF DESCRIPTION OF THE DRAWINGS

The accompanying drawings, which are incorporated into and constitute a part of this specification, illustrate implementations of the disclosure and together with the description, explain the principles of the disclosure.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
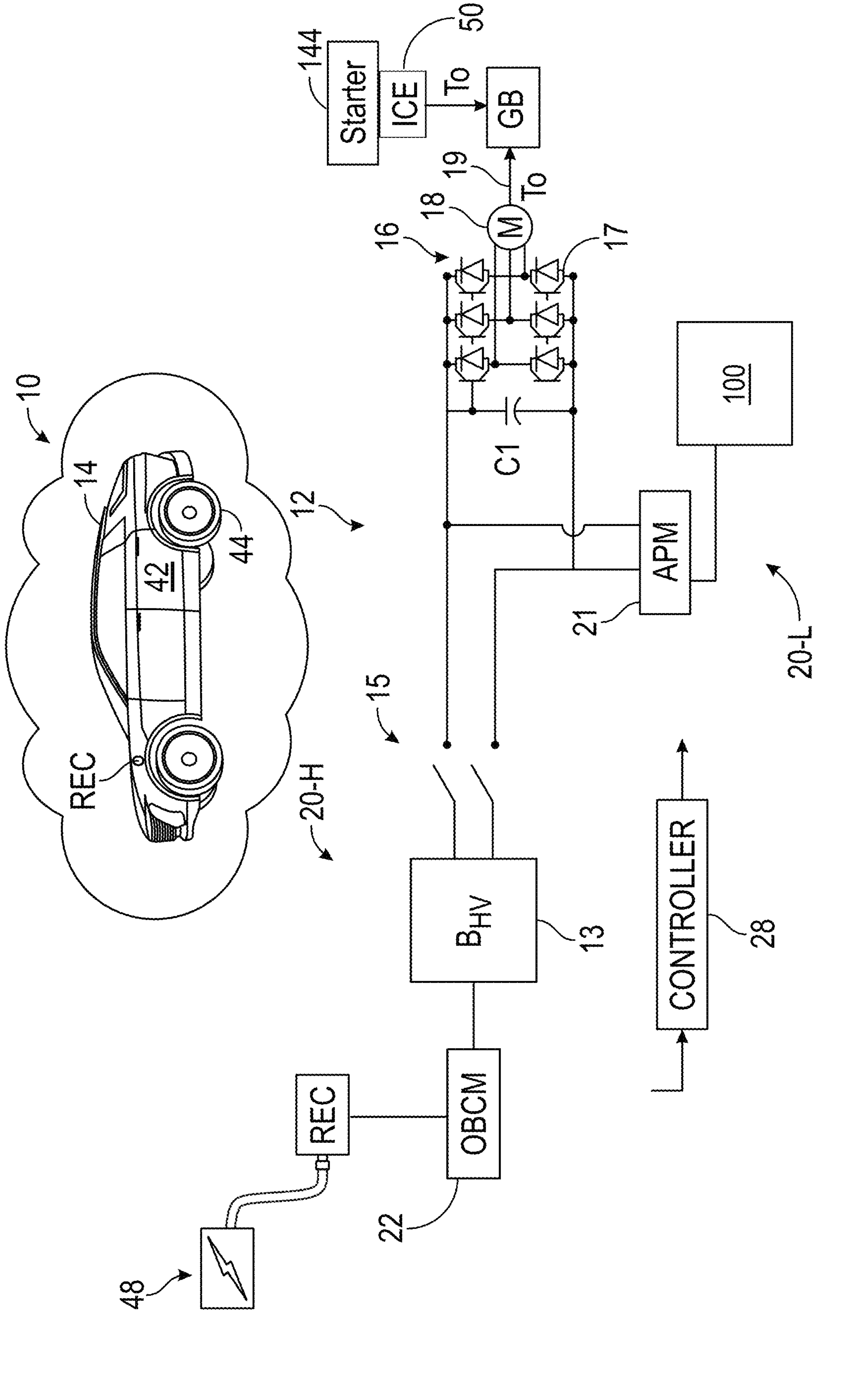
FIG. 1 schematically illustrates a vehicle having a low voltage power system.

Referring to the drawings, like reference numerals correspond to like or similar components throughout the several Figures. FIG. 1 illustrates an electrical system 12, e.g., an electrified powertrain system of a motor vehicle 10 having a vehicle body 14 defining a vehicle interior 42 or passenger compartment. The motor vehicle 10 of FIG. 1 includes a charging receptacle REC in communication with the electrical system 12. The motor vehicle 10 also includes road wheels 44 for traveling along roadways. The wheels 44 may be driven/powered through the electrical system 12 or undriven/freewheeling, as described in greater detail below.

Figure 2:
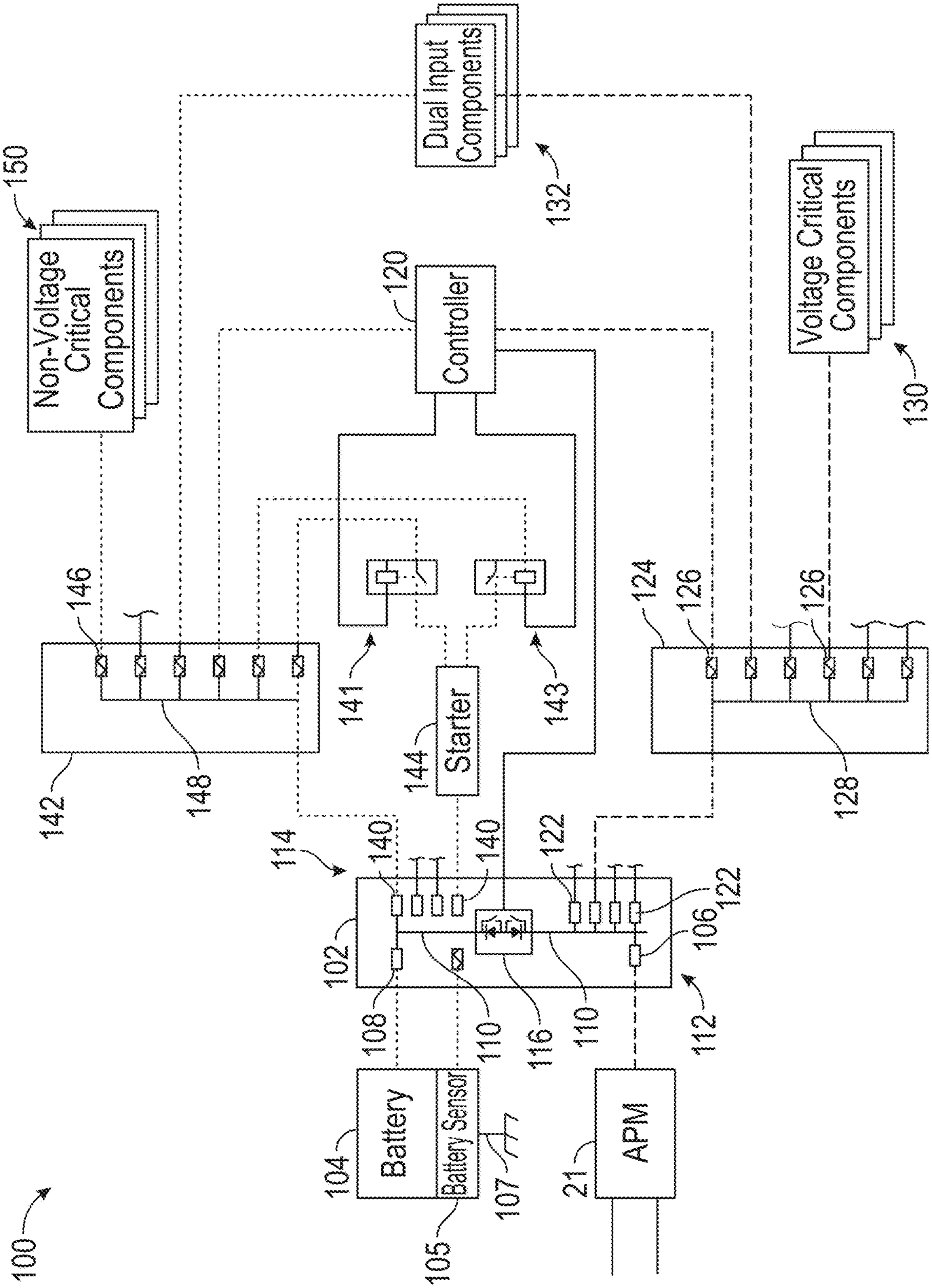
FIG. 2 is a schematic illustration of the low voltage power system of FIG. 1.

The electrical system 12 includes separate high voltage and low voltage buses. The high-voltage bus 20-H is electrically connected with a high-voltage battery pack assembly 13, such as a traction battery, and the low-voltage bus 20-L is electrically connected with an auxiliary battery 104 (FIG. 2). At least one on-board charging module ("OBCM") 22 includes inputs in communication with the charging receptacle REC as power converters to convert an AC power source from a charge station 48 to DC power at a DC outlet to charge the battery pack assembly 13. At least one auxiliary power module ("APM") 21 isolates the high-voltage bus 20-H from the low-voltage bus 20-L with input connected to the high-voltage bus 20-H and outputs connected to the low-voltage bus 20-L to charge the auxiliary battery 104 and power vehicle accessories, such as heated seats, power windows, or navigation systems. The OBCM 22 and APM 21 are both in communication with an electronic controller 28 in the electrical system 12.

The electronic controller 28 may include a computer and/or processor, and include software, hardware, memory, algorithms, connections, etc., for managing and controlling the operation of the motor vehicle 10. As such, a method, described below and generally represented in FIG. 3, may be embodied as a program or algorithm partially operable on the controller 28. It should be appreciated that the controller 28 may include a device capable of analyzing data from the sensors, comparing data, making the decisions required to control the operation of the motor vehicle 10, and executing the required tasks to control the operation of the motor vehicle 10.

The controller 28 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The controller 28 includes a tangible, non-transitory memory on which computer-executable instructions, including one or more algorithms, are recorded for regulating operation of the motor vehicle 10. The subject algorithm(s) may specifically include an algorithm configured to optimize energy usage of the motor vehicle 10.

Further, concerning the representative electrical system 12 of FIG. 1, the electrical system 12 is characterized by its separate high-voltage and low-voltage buses which are respectively labeled "20-H" and "20-L". For embodiments in which the electrical system 12 is part of the motor vehicle 10, e.g., an electric vehicle constructed as a battery electric vehicle, a hybrid electric vehicle, or an extended-range electric vehicle, the term "high-voltage" may encompass battery voltage capabilities of about 300 volts (V) or more. Such voltage levels are suitable for generating motive torque for vehicular propulsion functions and for powering various high-voltage accessories aboard the motor vehicle 10. The term "low-voltage" for its part refers to auxiliary voltage levels, typically below 60V. Low-voltage conductors (not shown) thus connect the low-voltage bus 20-L to one or more low-voltage accessories located aboard the motor vehicle 10, including but not limited to lights, radios, infotainment screens, sensors, etc.

In the exemplary embodiment of FIG. 1, the battery pack assembly 13 is selectively connected to and disconnected from a load by a set of high-voltage contactors 15. The applied load in the illustrated configuration includes a DC link capacitor (C1), a power inverter module ("inverter") 16 having a plurality of semiconductor switches 17 connected to an electric traction motor ("M") 18. As appreciated in the art, inverters such as the inverter 16 shown in FIG. 1 utilize multiple dies of the semiconductor switches 17 as fast-responding ON/OFF switching devices, e.g., insulated gate bipolar transistors ("IGBTs"), metal oxide semiconductor field-effect transistors ("MOSFETs"), thyristors, etc. In a typical three-phase configuration of the electric traction motor 18, the semiconductor switches 17 are turned ON or OFF at predetermined switching intervals to output an alternating current ("AC") waveform to the electric traction motor 18.

The electric traction motor 18 shown in FIG. 1 is connected to a rotatable output member 19, such as a motor shaft and connected to a gearbox for driving the wheels 44. During drive modes, the inverter 16 is controlled with pulse width modulation ("PWM") or another application-suitable switching control technique to energize phase windings of the electric traction motor 18. As depicted, the electric traction motor 18 is a polyphase AC motor, in this instance exemplified as a three-phase machine. Rotation of the output member 19 ultimately transfers torque (To) to a coupled load, including a gear box GB and one or more road wheels 44 of the motor vehicle 10. Furthermore, an internal combustion engine (ICE) 50 is configured to transfer torque (To) to the gear box GB and one or more of the road wheels 44.

As shown in FIG. 2, the APM 21, or power source, provides low voltage DC power to the low voltage power system 100 from the high-voltage battery pack assembly 13. The APM 21 and auxiliary battery 104, or low voltage power source, are each separately connected to a main power distribution module 102 through a first and second input fuse 106 and 108, respectively. Power from the APM 21 and the battery 104 can be selectively shared across a main bus 110. The main bus 110 is separated into a first portion 112 powered by the APM 21 and a second portion 114 powered by the battery 104 by a switch 116 that can be opened or closed to connect the first and second portions. In the illustrated example, the switch 116 includes a pair of bi-direction field-effect transistor. The switch 116 includes a micro-controller that selectively moves the transistors between an open and a closed position in response to a command from the controller 120 through a communication protocol, such as a local interconnect network (LIN), a controller area network (CAN), or ethernet during certain operating scenarios as outlined in greater detail below. The controller 120 is embodied in the same manner as discussed above with respect to the controller 28.

The first portion 112 includes first main output fuses 122 electrically connected with various electrical components on the vehicle 10 to protect the power delivery path. In the illustrated example, one of the first main output fuses 122 powers a first grid 124. The first grid 124 includes a bus 128 that is electrically connected with first grid fuses 126. The first grid fuses 126 includes a lower power amperage rating than the first main output fuses 122. For example, the first main output fuses 122 can include an amperage rating of 80 or more amps and the first grid fuses 126 include an amperage rating of 60 or less amps. In addition to powering the first grid 124, the first main fuses could provide power to a steering system or a braking system on the vehicle 10.

In the illustrated example, the first grid 124 provides electrical power to voltage critical components 130, dual input components 132, and the controller 120. Example voltage critical components include sensitive electronics such as a vehicle dash display, interior or exterior lights, radio display, power ports (e.g., USB, etc.), audio components, HVAC blower, steering, etc. Example dual input components include a vehicle body controller, an engine controller, or a transmission controller.

The second portion 114 includes second main output fuses 140 electrically connected with various electrical components on the vehicle 10. In the illustrated example, one of the second main output fuses 140 is electrically connected with a second grid 142 and a starter 144 for starting the ICE 50. In addition to the second grid 142 and the starter 144, the second main output fuses 140 can be electrically connected to other high current devices, such as cooling fans, on the vehicle 10.

The second grid 142 includes a bus 148 electrically connected with second grid fuses 146. The second grid fuses 146 includes a lower power amperage rating that is lower than the first main output fuses 122. For example, the second main output fuses 140 include an amperage rating of 80 or more amps and the second grid fuses 146 include an amperage rating of 60 or less amps.

In the illustrated example, the second grid 142 provides electrical power to non-voltage critical components 150, the dual input components 132, and the controller 120. Example non-voltage critical components include power windows, doors, heated seats, a heated steering wheel, door locks, heated glass, etc.

As discussed in greater detail below with respect to FIG. 3, one feature of this disclosure is to provide stable power to voltage-critical components during starting operations of the ICE 50 where the starter 144 is in an on or active position through selectively opening and closing the switch 116. Additionally, this disclosure provides redundant or dual power to the controller 120 and the dual input components 132. Therefore, the voltage critical components 130 are not subject to a voltage drop during operation of the starter 144 because the switch 116 isolates the voltage critical components 130 from the second portion 114 that provides power to the starter 144.

Figure 3:
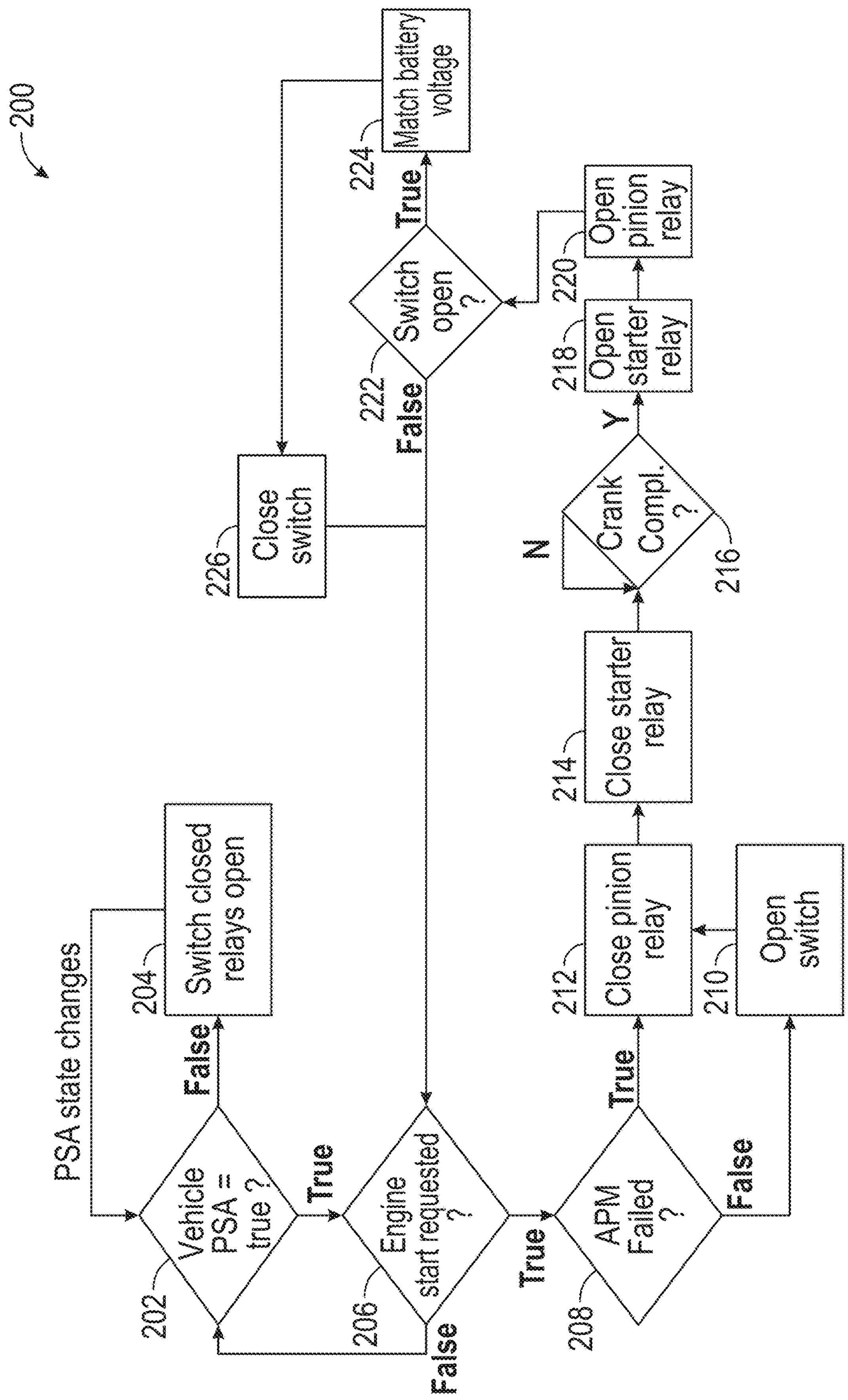
FIG. 3 is a flowchart of an example method of operating the low voltage power system of FIG. 1.

FIG. 3 illustrates a flowchart of an example method 200 of operating the low voltage power system 100 of FIG. 2. The method 200 beings as block 202 by investigating vehicle propulsion system active (PSA). The vehicle PSA include a condition where the vehicle 10 is able to propel itself based on driver commands. At block 202 ("Vehicle PSA=True?"), the method 200 determines if the vehicle PSA is true or if the vehicle 10 is ready to propel itself based on commands from a driver. The vehicle PSA includes a request to start the ICE 50 during an auto start/stop situation or during a flying start event when the vehicle 10 is already moving. Furthermore, the vehicle PSA would remain false if it was a cold start or first time the engine was started during a trip while the vehicle 10 was not already being propelled by the electric propulsion system. If there is not a request to start the ICE 50 under these situations, the method 200 then proceeds to block 204.

At block 204 ("Switch Open and Relays Open"), the method 200 maintains the switch 116 in a closed position electrically connecting the first portion 112 and the second portion 114 of the bus 110 with the starter relay 141 and the pinion relay 143 each in an open position. When the starter relay 141 and the pinion relay 143 are in the open position, no power will be directed to the starter 144 to start the ICE 50. When there is a PSA state change, such as an auto start/stop situation or a flying start event, the method 200 returns to block 202. With the PSA state change that returned the method 200 to block 202, the method 200 then proceeds to block 206.

At block 206 ("Engine Start Requested?"), the method 200 determines if an engine start for the ICE 50 was requested. In one example, the engine start request can originate from the controller 28 and is received by the controller 120. If the PSA state change does not include an engine start request, the method 200 returns to block 202 to continue monitoring the vehicle PSA. If the vehicle start request was received, the method 200 then proceeds to block 208.

At block 208 (APM Failed?"), the method 200 determines if the APM 21 has failed. If the APM 21 is operational and able to output the desired DC voltage to the main power distribution module 102, the method 200 proceeds to block 210. At block 210 ("Open Switch"), the controller 120 directs the switch 116 to an open position through command signals directing the gates on the switch 116 to open. The method 200 then proceeds to block 212 from block 210. Furthermore, if the APM 21 is determined to have failed at block 208, the method 200 also proceeds to block 212.

At block 212 ("Close Pinion Relay"), the controller 120 sends control signals to the pinion relay 143 to move the pinion relay from an open position to a closed position. The method 200 then proceeds to block 214. At block 214 ("Close starter relay"), the controller 120 sends control signals to the starter relay 141 to move the starter relay from an open position to a closed position. With the pinion relay and the starter relay both in the closed position, power is directed to the starter 144 from the second grid 142. The method 200 then proceeds to block 216.

At block 216 ("Crank Complete?"), the method 200 determines if an engine crank is completed or if the engine crank failed through monitoring the ICE 50 with one of the controller 28 or 120. If the engine crank is not complete, the method 200 returns to block 216. If the engine crank is complete, the method 200 proceeds to block 218 ("Open Starter Relay") and the controller 120 sends control signals to the starter relay 141 to move the starter relay 141 from the closed position to the open position. The method 200 then proceeds to block 220 ("Open Pinion Relay") and the controller 120 sends control signals to the pinion relay to move the pinion relay from the closed position to the open position. The method 200 then proceeds to block 222.

At block 222 ("Switch Open?"), the method 200 determines if the switch 116 is open. The method 200 can determine if the switch 116 is open based on the voltage(s) sent to the gates on the switch 116. If the switch 116 is open, the method 200 proceeds to block 224. At block 224 ("Match Battery Voltage"), a voltage setpoint for the APM 21 is adjusted to match a voltage of the battery 104. In one example, the voltage setpoint of the APM 21 is adjusted to between 0.0 and 0.5 volts of the voltage of the battery 104. As shown in FIG. 2, the voltage of the battery 104 is determined by the battery voltage sensor 105 connected to a ground 107 and in communication with the second portion 114 of the bus 110. The voltage determined by the battery voltage sensor 105 can then be relayed to the controller 28 or 120 to adjust the APM 21 setpoint. Once the voltages are matched between the first and second portions 112 and 114, the method 200 proceeds to block 226 ("Close Switch") and sends voltages to the gates on the switch 116 to move the switch from the open position to the closed position. If the method 200 determined that the switch 116 was not open at block 222 or once the switch 116 was closed at block 226, the method 200 then proceeds to block 206 to continue to monitor for an engine start request. The method can continue to follow this flow chart while the vehicle 10 is in an "On" or operational state.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure is not limited to the particular embodiments disclosed but will include embodiments falling within the scope thereof.

What is claimed is:

1. A low voltage power system, comprising:

a first power source electrically connected with a main power distribution module;

a second power source electrically connected with the main power distribution module, wherein the second power source includes an auxiliary power source configured to receive power from a traction battery and the main power distribution module includes a first portion and a second portion with the first portion selectively connectable to the second portion with a switch;

a first power grid electrically connected with the first portion of the main power distribution module;

a second power grid electrically connected with the second portion of the main power distribution module;

a starter relay electrically connected with the first power source through the first power grid; and a controller in electrical communication with the starter relay and the switch, wherein the controller is configured to:

selectively actuate the switch from a closed position to an open position based on an engine start request and a status of the second power source;

wherein the main power distribution module includes a first input fuse electrically connecting the first power source with a first bus bar portion of the first portion, a second input fuse electrically connecting the second power source with a second bus bar portion of the second portion with the switch selectively connecting the first bus bar portion to the second bus bar portion, a first plurality of main output fuses are electrically connected to the first bus bar portion, a second plurality of main output fuses are electrically connected to the second bus bar portion, the first power grid includes a first power grid bus bar electrically connected to one of the first plurality of main output fuses and a plurality of first power grid output fuses electrically connected to the first power grid bus bar, the second power grid includes a second power grid bus bar electrically connected to one of the second plurality of main output fuses and a plurality of second power grid output fuses electrically connected to the first power grid bus bar, the first and second plurality of main output fuses each having a greater amperage rating than the plurality of first and second power grid output fuses, and a pinion relay electrically connected to the one of the plurality of first power grid output fuses.

2. The system of claim 1, wherein the controller is configured to close the starter relay and open the switch in response to the engine start request and the status of the second power source being operational.

3. The system of claim 1, wherein the controller is configured to close the starter relay and maintain the switch in a closed position in response to the engine start request and the second power source being non-operational.

4. The system of claim 1, wherein the controller is configured to selectively open the switch upon receiving an engine start request and a functional operating status of the second power source.

5. The system of claim 1, wherein the first portion of the main power distribution module is isolated from the second portion of the main power distribution module when the switch is open, the second power source includes an auxiliary power module in electrical communication with a traction battery, the first power source and the second power source operate at under 20V, the traction battery operates at 300V or more, and the controller is configured to vary a voltage setpoint for the auxiliary power module to match a voltage of the first power source.

6. The system of claim 1, wherein the first power grid is electrically connected with a first plurality of electrical components and the first plurality of electrical components are non-voltage critical components, the first power source and the second power source operate at under 20V, the second power source includes an auxiliary power module in electrical communication with a traction battery configured to operate at 300V or more.

7. The system of claim 6, wherein the second power grid is electrically connected with a second plurality of electrical components and the second plurality of electrical components include voltage critical components.

8. The system of claim 7, including a plurality of dual input electrical components each electrically connected with the first power grid and the second power grid, wherein the voltage critical components include a vehicle dash display and the dual input electrical components include a vehicle body controller and an engine controller.

9. The system of claim 1, wherein the switch includes at least one bi-direction field-effect transistor.

10. The system of claim 1, wherein the switch includes a pair of bi-direction field-effect transistors.

11. The system of claim 1, wherein the first power source and the second power source operate at under 20V and the second power source includes an auxiliary power module in electrical communication with a traction battery configured to operate at 300V or more.

12. The system of claim 11, wherein the first power source includes a low voltage battery and the second power source includes an auxiliary power module.

13. A method of operating a low voltage power system, the method comprising:

receiving an engine start request to start an internal combustion engine with a low voltage power system, wherein the low voltage power system includes:

a first power source electrically connected with a main power distribution module;

a second power source electrically connected with the main power distribution module, wherein the second power source includes an auxiliary power source in electrical communication with a traction battery and the main power distribution module includes a first and a second portion with the first portion selectively connectable to the second portion with a switch;

a first power grid electrically connected with the first portion of the main power distribution module;

a second power grid electrically connected with the second portion of the main power distribution module; and a starter relay in electrical communication with the first power source through the first power grid;

selectively actuating the switch based on the engine start request and a status of the second power source; and wherein the main power distribution module includes a first input fuse electrically connecting the first power source with a first bus bar portion of the first portion, a second input fuse electrically connecting the second power source with a second bus bar portion of the second portion with the switch selectively connecting the first bus bar portion to the second bus bar portion, a first plurality of main output fuses are electrically connected to the first bus bar portion, a second plurality of main output fuses are electrically connected to the second bus bar portion, the first power grid includes a first power grid bus bar electrically connected to one of the first plurality of main output fuses and a plurality of first power grid output fuses electrically connected to the first power grid bus bar, the second power grid includes a second power grid bus bar electrically connected to one of the second plurality of main output fuses and a plurality of second power grid output fuses electrically connected to the first power grid bus bar, the first and second plurality of main output fuses each having a greater amperage rating than the plurality of first and second power grid output fuses, and a pinion relay electrically connected to the one of the plurality of first power grid output fuses.

14. The method of claim 13, wherein the method includes closing the starter relay and opening the switch in response to the engine start request and the status of the second power source being operational to vary an output of a voltage setpoint for the second power source to match an operating voltage of the first power source, and the second power source includes an auxiliary power module in electrical communication with a traction battery configured to operate at 300V or more.

15. The method of claim 13, wherein the method includes closing the starter relay and maintaining the switch in a closed position in response to the engine start request and the second power source being non-operational.

16. The method of claim 13, wherein the method includes selectively opening the switch upon receiving the engine start request and a functional operating status of the second power source and the second power source includes an auxiliary power module in electrical communication with a traction battery configured to operate at 300V or more.

17. A vehicle comprising:

a body at least partially defining a passenger cabin;

a plurality of wheels supporting the body;

an internal combustion engine configured to drive the plurality of wheels;

a starter in engagement with the internal combustion engine and configured to start the internal combustion engine;

a traction motor electrically connected with a traction battery and configured to drive the plurality of wheels in connection with the internal combustion engine; and a low voltage power system, wherein the low voltage power system includes:

a first power source electrically connected with a main power distribution module;

a second power source electrically connected with the main power distribution module, wherein the second power source includes an auxiliary power source in electrical communication with the traction battery and the main power distribution module includes a first portion and a second portion with the first portion selectively connectable to the second portion with a switch;

a first power grid electrically connected with the first portion of the main power distribution module;

a second power grid electrically connected with the second portion of the main power distribution module;

a starter relay electrically connected with the first power source through the first power grid; and a controller in electrical communication with the starter relay and the switch, wherein the controller is configured to:

selectively actuate the switch from a closed position to an open position based on an engine start request and a status of the second power source;

wherein the main power distribution module includes a first input fuse electrically connecting the first power source with a first bus bar portion of the first portion of the main power distribution module, a second input fuse electrically connecting the second power source with a second bus bar portion of the second portion of the main power distribution module with the switch selectively connecting the first bus bar portion to the second bus bar portion, a first plurality of main output fuses are electrically connected to the first bus bar portion, a second plurality of main output fuses are electrically connected to the second bus bar portion, the first power grid includes a first power grid bus bar electrically connected to one of the first plurality of main output fuses and a plurality of first power grid output fuses electrically connected to the first power grid bus bar, the second power grid includes a second power grid bus bar electrically connected to one of the second plurality of main output fuses and a plurality of second power grid output fuses electrically connected to the first power grid bus bar, the first and second plurality of main output fuses each having a greater amperage rating than the plurality of first and second power grid output fuses, and a pinion relay electrically connected to the one of the plurality of first power grid output fuses.

18. The vehicle of claim 17, wherein the controller is configured to close the starter relay and open the switch in response to the engine start request and the status of the second power source being operational and the first power source and the second power source operate at under 20V.

19. The vehicle of claim 17, wherein the controller is configured to close the starter relay and maintain the switch in a closed position in response to the engine start request and the second power source being non-operational.

20. The vehicle of claim 17, wherein the first portion of the main power distribution module is isolated from the second portion of the main power distribution module when the switch is open, the first power source and the second power source operate at under 20V, the traction battery operates at 300V or more, and the controller is configured to vary a voltage setpoint for the auxiliary power module to match a voltage of the first power source.

* * * * *